United States Patent
Hong

(12) 
(10) Patent No.: US 8,879,830 B2
(45) Date of Patent: Nov. 4, 2014

(54) CONTROL METHOD AND APPARATUS FOR STEREOSCOPIC DISPLAY

(75) Inventor: Ye Hong, Shandong (CN)

(73) Assignee: Hisense Hiview Tech Co., Ltd. (CN)

(*) Notice: Subject to any disclaimer, the term of this patent is extended or adjusted under 35 U.S.C. 154(b) by 127 days.

(21) Appl. No.: 13/695,477

(22) PCT Filed: Jan. 18, 2011

(86) PCT No.: PCT/CN2011/070361
§ 371 (c)(1),
(2), (4) Date: Oct. 31, 2012

(87) PCT Pub. No.: WO2012/097503
PCT Pub. Date: Jul. 26, 2012

(65) Prior Publication Data
US 2013/0044109 A1 Feb. 21, 2013

(51) Int. Cl.
*G06K 9/00* (2006.01)
*G02B 27/22* (2006.01)
*G02B 27/00* (2006.01)

(52) U.S. Cl.
CPC ............ *G02B 27/22* (2013.01); *G02B 27/0093* (2013.01)
USPC .......................................................... 382/154

(58) Field of Classification Search
USPC .......................................................... 382/154
See application file for complete search history.

(56) References Cited

U.S. PATENT DOCUMENTS

| | | | |
|---|---|---|---|
| 5,742,331 A * | 4/1998 | Uomori et al. | 348/51 |
| 5,742,332 A | 4/1998 | Imai et al. | |
| 8,019,146 B2 | 9/2011 | Koo et al. | |
| 8,094,120 B2 * | 1/2012 | Ratai | 345/156 |
| 8,165,347 B2 * | 4/2012 | Heinzmann et al. | 382/103 |
| 8,315,443 B2 * | 11/2012 | Bi et al. | 382/118 |
| 8,581,966 B2 * | 11/2013 | Chen et al. | 348/51 |
| 2010/0283839 A1 * | 11/2010 | Liu et al. | 348/51 |

FOREIGN PATENT DOCUMENTS

| | | |
|---|---|---|
| CN | 1476730 A | 2/2004 |
| CN | 1943249 A | 4/2007 |
| CN | 2911717 Y | 6/2007 |
| CN | 101909219 A | 12/2010 |
| EP | 0 656 555 A1 | 6/1995 |
| JP | 11-234705 A | 8/1999 |
| JP | 2000-152285 A | 5/2000 |
| WO | 96/18925 A1 | 6/1996 |

* cited by examiner

*Primary Examiner* — Utpal Shah
(74) *Attorney, Agent, or Firm* — DLA Piper LLP (US)

(57) ABSTRACT

A control method and apparatus for stereoscopic display is provided. The method includes: obtaining the position change information of glasses of a user (s101); and then calibrating the image of display according to the position change information of glasses of the user (s102). The control apparatus includes: an obtaining module (101) which obtains the position change information of glasses of a user; and a calibrating module (102) which calibrates the image of display according to the position change information of glasses of the user. Compared with the prior art, the present invention can effectively solves the problem that stereoscopic effect is not real, due to the stereo virtual image position changed along with the moving head position of the user.

11 Claims, 5 Drawing Sheets

CONTROL METHOD AND APPARATUS FOR STEREOSCOPIC DISPLAY

CROSS REFERENCE TO RELATED APPLICATIONS

The present application is a US National Stage of International Application No. PCT/CN2011/070361, filed 18 Jan. 2011, and designating the United States.

FIELD OF THE INVENTION

The present invention relates to the field of stereoscopic display, and in particular, to a method and apparatus for controlling stereoscopic display.

BACKGROUND OF THE INVENTION

Currently, the stereoscopic display technologies are rapidly developed. The stereoscopic display technology forms a stereoscopic impression using the binocular parallax. The main stereoscopic display technology adopts the spectacles mode which is more mature and more economical than the naked-eye mode. The stereoscopic display of spectacles mode further includes red interconvert blue mode, shutter mode and polarized light mode that enable the left and right eyes to receive different pictures in different manners (wavelength, time and polarization difference). Reference is made to FIG. 1 which is a stereo virtual image produced by extending the images in an opposite direction until the images overlap, the images based on matter of people's left and right eyes saw. It can be seen from FIG. 1 that the distance from the virtual image to the display screen is not fixed but is proportional to the distance between the human eyes and the display screen. Thus, the location of the stereo virtual image also moves following the movement of the head of the user but is not changeless; therefore, a problem of irreal stereoscopic impression is brought to the user.

In the prior art, the automatic tracking technology is used in most cases in order to reduce the irreal stereoscopic impression of the stereo virtual image due to change of the user's location. For instance, in the invention for a patent of the application No. 02803042.7 and publication No. CN1476730A, entitled Autostereoscopic Image Display with Observer Tracking System, the apparatus uses a viewpoint tracker to control the slits of the parallax barrier to vary the incidence of light beams into the lenses to effect the angle of refraction within the lenses causing the outgoing lightbeams carrying pixels of the right and left eye views to converge into at least one distinct right and one distinct left eye view focus, respectively, coinciding with the eye positions of said observers, so as to reduce the irreal impression of the stereo virtual image due to change of the user position. Samsung discloses in the invention for a patent of the application No. 200710180225.X, entitled Method for Adjusting Disparity in Three-dimensional Image and Three-dimensional Imaging Device thereof, which uses a parallax estimator and a parallax adjustor to adjust the image by estimating the parallax so as to provide an optimal stereoscopic effect to the user.

Though the solutions in the prior art reduce the problem of irreal stereoscopic impression of the stereo virtual image due to change of the user's location, they are obviously not sufficient to maintain a real stereoscopic impression of the virtual image.

SUMMARY OF THE INVENTION

The main object of the present invention is to provide a method and apparatus for controlling stereoscopic display so as to solve the problem of irreal stereoscopic impression due to change of the user's location in the prior art.

In order to achieve the above object, the following technical solution is used according to one aspect of the present invention:

A method for controlling stereoscopic display, comprising: obtaining location change information of user spectacles; and correcting an image on the display screen according to the location change information of the user spectacles.

An apparatus for controlling a stereoscopic display is provided according to the other aspect of the present invention, comprising: an obtaining module configured to obtain location change information of the user spectacles; and a correcting module configured to correct an image on the display screen according to the locating change information of the user spectacles.

The above technical solutions have the following beneficial effects: by using a distance measuring technology, a method and apparatus for controlling stereoscopic display precisely calculates change due to the movement of the user's location according to the distance measuring result and calculates the data information for correcting the display screen image in order to maintain the virtual image to be unchanged, so as to overcome the technical problem of irreal stereoscopic impression due to the change of the user's location, further to correct the display screen image, and to achieve the beneficial effect of maintaining the virtual image to be unchanged.

BRIEF DESCRIPTION OF THE DRAWINGS

The accompanying drawings herein constitute a part of the present application for further understanding the present invention. The exemplary embodiments of the present invention and descriptions thereof illustrate the present invention without unduly limiting the scope of the present invention. In the drawings.

DETAILED DESCRIPTION OF EMBODIMENTS

It should be indicated that the embodiments and features therein in the present application may be combined with each other in the situation that they are not conflicted. The present invention will be described in detail in conjunction with the accompanying drawings and the embodiments.

Figure 1:
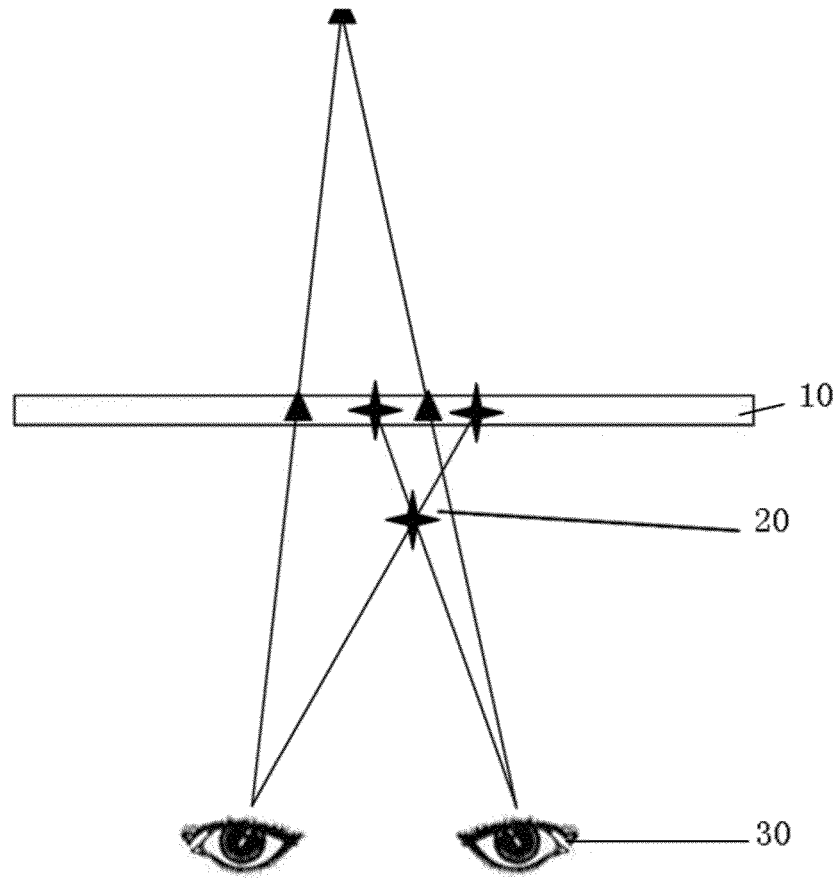
FIG. 1 is a view of a stereo virtual image produced by extending the left and right eye images viewed by human eyes in an opposite direction until the images overlap according to the background art of the present invention.
Figure 2:
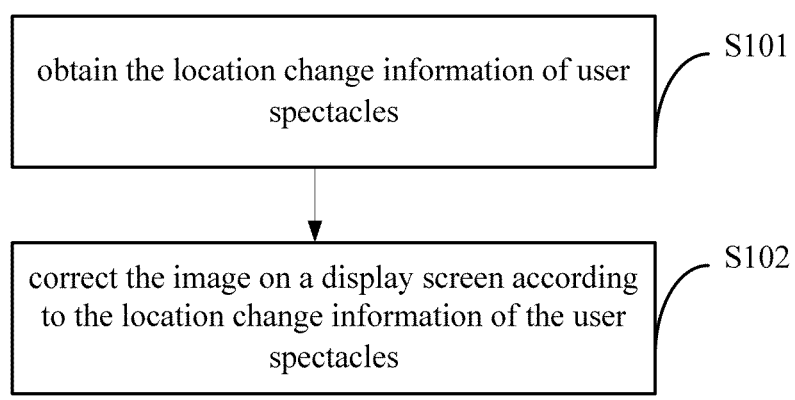
FIG. 2 is a view of main flow of a method for controlling stereoscopic display according to one embodiment of the present invention.

FIG. 2 is a view of main flow of a method for controlling stereoscopic display according to one embodiment of the present invention. With reference to FIG. 2, a method for controlling stereoscopic display comprises:

S101: location change information of user spectacles 30 is obtained.

Preferably, the location change information of the user spectacles 30 may be obtained in the following manner:

Firstly, judging whether locations of the user spectacles 30 are changed or not; and then Obtaining the location change information of the user spectacles 30 when the locations of the user spectacles 30 are determined to be changed.

Specifically, a distance measuring technology such as infrared distance measuring technology can be used to monitor the distance between the user spectacles 30 and the display screen 10, and judges hourly whether the distance is changed or not. When it is determined that the locations of the user spectacles 30 are changed, an original location of the user is firstly obtained, i.e. first location information of the user spectacles 30 is obtained; then, final location information of the user spectacles 30 is obtained, i.e. second location information of the user spectacles 30 is obtained; the location change information of the user spectacles 30 can be obtained according to the first location information and the second location information.

The present invention is applied to the stereoscopic spectacles display. The distance measuring technology mainly monitors a distance L between the spectacles and the display screen 10, obtains the first location information and the second location information of the user spectacles 30 when L is changed, and obtains the location change information.

S102: an image on the display screen 10 is corrected according to the location change information of the user spectacles 30.

When L above is changed, a virtual image location 20 seen by the user at the original location is also changed. The image on the display screen 10 should be corrected in order to maintain the virtual image location 20 seen by the user not to be changed when L is changed.

Moreover, after the original location of the user is changed, the change of original virtual image can be represented in two aspects according to the final location of the user: virtual image amplification and reduction and change in the virtual image location 20. Therefore, the image on the display screen 10 should be corrected on the two aspects in order to assure that the virtual image seen is not changed after the user's location is changed.

Figure 3:
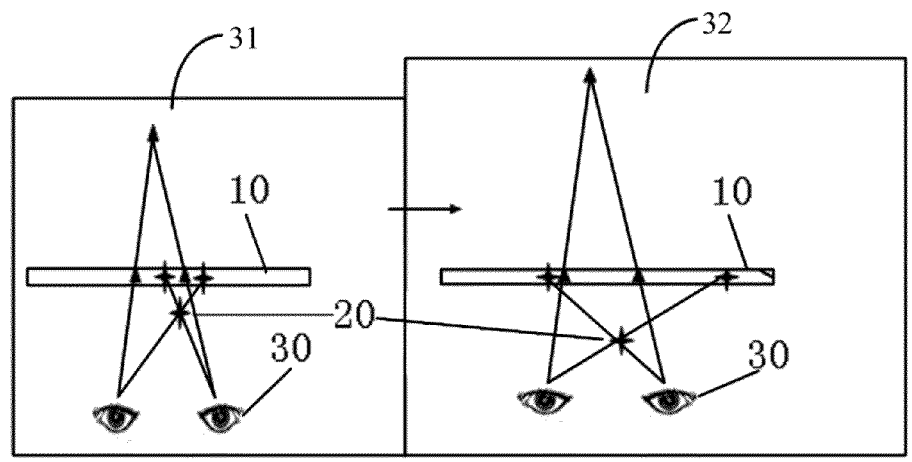
FIG. 3 is views of location changes of a virtual image when the image is unchanged but a user comes near according to one embodiment of the present invention.

Reference is made to FIG. 3 which is views of changes of locations of the virtual image location 20 when the image is unchanged but the user's location comes near. FIG. 31 is the virtual image location 20 seen by the user in the original location. The virtual image location 20 is changed when the user comes near to the display screen 10. As shown in FIG. 32, the virtual image location 20 should be immovable when the user moves in order to produce a real stereoscopic impression, i.e. a distance between the virtual image and the display screen 10 should be unchanged taking the display screen 10 as a reference object. At this time, the image on the display screen 10 should be corrected in order to assure that the virtual image seen is still in the original location when the user's location is changed.

Specifically, it may include two aspects, i.e. when the user comes near to the display screen 10 and when the user goes away from the display screen 10.

When the user comes near to the display screen 10, a size of the image should be amplified $l/l'$ times to maintain the size of the virtual image to be unchanged, wherein $l$ is an original distance between the user and the virtual image, and $l'$ is a final distance between the user and the virtual image.

But in fact, the size of the image is amplified $L/L'$ times, wherein L is an original distance between the user and the display screen 10 and $L'$ is a final distance between the user and the display screen 10.

Therefore, when the user comes near to the display screen 10, the times that the image on the display screen 10 should be finally amplified is calculated by a formula $(l \times L')/(l' \times L)$, i.e. it should be finally amplified $(l \times L')/[l-(L-L')] \times L)$ times, in order to maintain the size of the virtual image to be unchanged (as the distance of the user moves is $m=L-L'=l-l'$, that is, $[(L-S) \times L']/[(L'-S) \times L]$ times (as the distance, or depth between the virtual image and the screen is $S=L-l$).

Preferably, the $l$ and $l'$ above also can be obtained through a distance measuring technology such as infrared distance measuring technology. When L above is changed, the locations that should be obtained include the original distance L between the user and the display screen 10 and the final distance $L'$ between the user and the display screen 10; moreover, the virtual image location 20 seen by the user in the original location is also changed, at this moment, the distance $l$ between the user and the virtual image should be obtained, and $l'$ should be obtained when $l$ is changed. The $l'$ is the final distance between the user and the virtual image.

Thus, different object portions in the image picture should be corrected distinctively according to different virtual image locations 20 thereof. That is to say, the stereo depth of each object in the image should be known before correction.

Figure 4:
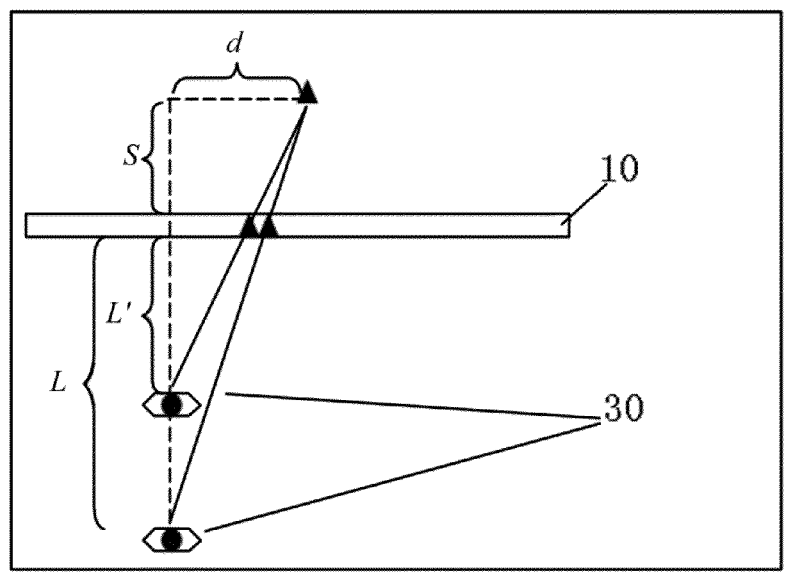
FIG. 4 is a view of image location change when the virtual image location is maintained immovable but the user comes near according to one embodiment of the present invention.

Similarly, when the user comes near to the display screen 10, each object in the image should be moved in a direction away from the center of the display screen 10 (assume that the user views the image just facing a plane, i.e. a projection point of the user on the plane of the display screen 10 is just the center of the display screen 10). Reference is made to FIG. 4 which is a view of image location change when the virtual image location 20 is maintained immovable but the user comes near according to one embodiment of the present invention. The distance moved in an image direction is $[(d \times S)/(L'-S)]-[(d \times S)/(L-S)]=[(L-L') \times d \times S]/[(L'-S) \times (L-S)]$, wherein S is a distance between the virtual image and the display screen 10, d is a distance between the virtual image and screen center, L is the original distance between the user and the display screen 10, and $L'$ is the final distance between the user and the display screen 10.

On the other aspect, when the user goes away from the display screen 10, in order to maintain the location and size of the virtual image to be unchanged, the image on the display screen 10 is corrected in the same manner as in the situation when the user comes near to the display screen 10, i.e. out-of-screen is positive, and in-screen is negative.

Specifically, when the user goes away from the display screen 10, the size of the image should be reduced $l/l'$ times in order to maintain the size of the virtual image to be unchanged, wherein $l$ is the original distance between the user and the virtual image, and $l'$ is the final distance between the user and the virtual image.

But in fact, the size of the image is reduced $L/L'$, wherein L is the original distance between the user and the display screen 10, and $L'$ is the final distance between the user and the display screen 10.

Therefore, when the user goes away from the display screen 10, the times that the image on the display screen 10 should be finally reduced is calculated by the formula $(l \times L')/(l' \times L)$, i.e. $(l \times L')/[l-(L-L')] \times L)$ times, in order to maintain the size of the virtual image to be unchanged (as the distance the user moves is m=L−L'=l−l', that is, $[(L−S)×L']/[(L'−S)×L]$ times (as the distance, or depth between the virtual image and the screen is S=L−l).

Similarly, when the user goes away from the display screen 10, each object in the image should come near to the center of the display screen 10 in order to maintain the location of the virtual image to be unchanged, in the image location change view when the user goes away, the distance moved in an image direction is $[(d×S)/(L'−S)]−[(d×S)/(L−S)]=[(L−L')×d×S]/[(L'−S)×(L−S)]$, wherein S is the distance between the virtual image and the display screen 10, d is the distance between the virtual image and the screen center, L is the original distance between the user and the display screen 10, and L' is the final distance between the user and the display screen 10.

Figure 5:
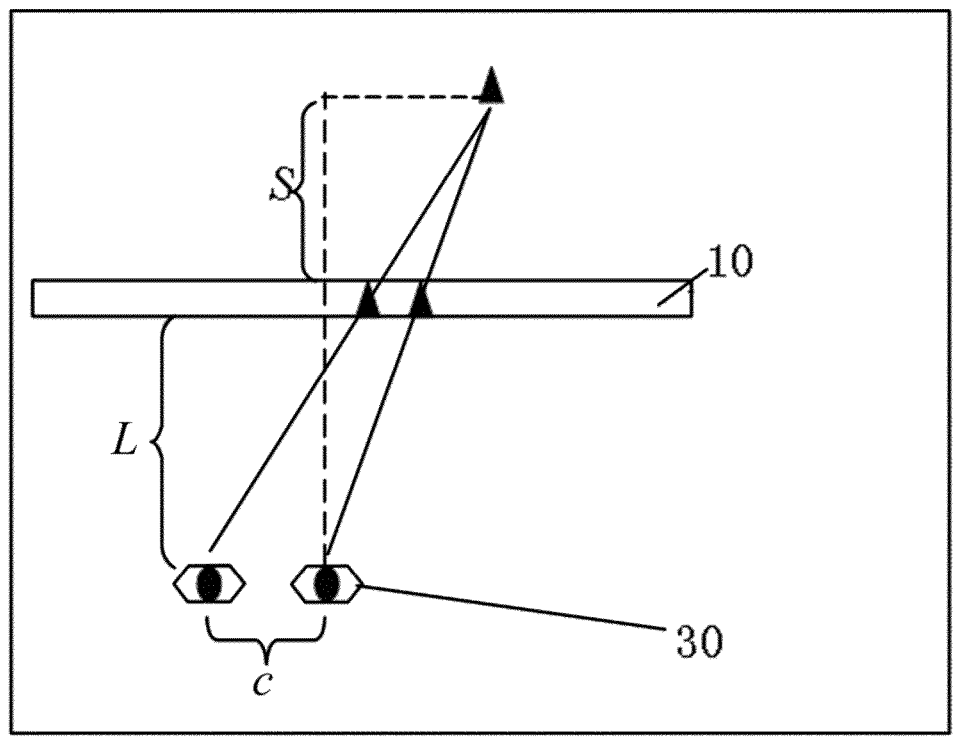
FIG. 5 is a view of image location change when the virtual image location is maintained immovable but the user moves in horizontal according to one embodiment of the present invention.

In addition, when the user makes a movement c parallel to the plane of the display screen 10 in a small range just facing the display screen 10, each object in the image should move for $(c×S)/(S−L)$ in the same direction in order to maintain the location of the virtual image to be unchanged. Reference is made to FIG. 5 which is a view of image location change when the virtual image location 20 is maintained immovable but the user moves in horizontal according to one embodiment of the present invention.

Similarly, movement of the user parallel to the plane of the display screen 10 in a small range just facing the display screen 10 is also divided into two aspects, i.e. leftward movement and rightward movement, at this time, the image just needs to be corrected in the same direction as the user moves, and the distance moved is calculated by the formula $(c×S)/(S−L)$.

To sum up, when the user moves (the movement may be divided into vertical movement in distance and equidistant horizontal movement), three corrections above should be carried out for the image, thus the size and location of the virtual image may be assured to be unchanged and the sense of reality is improved.

Therefore, correction times, horizontal correction information and vertical correction information of the virtual image should be obtained according to the location change information of the user spectacles 30; and the image on the display screen 10 is corrected according to the correction times, horizontal correction information and vertical correction information.

But in practice, it demands high processing capability to carry out different treatments to each object in the image, a processor should distinguish each object, the distance d between the object and the image center, and stereo depth S thereof. It is quite hard to obtain all these parameters in practice.

When a distance between the object virtual image in the image and the display screen 10 can be neglected with respect to the distance between the user and the display screen 10 (S is far smaller than L), the size of the virtual image substantially can be maintained to be unchanged when the user moves, thus, only the location of the image needs to be corrected.

Assume that all objects in the image picture are displayed in the screen, i.e. in screen (S is a negative), and the Ses of all objects approximate and are not quite different, it may continue to be approximately simplified as relative displacement of the left and right images.

Preferably, movement of the user with respect to the display screen 10 is not limited to movements in the horizontal and vertical directions, at this time, the location change information of the user with respect to the display screen 10 should be decomposed specifically in the following manner: monitoring the distance L between the spectacles and the display screen 10 using the distance measuring technology such as infrared distance measuring technology, obtaining the first location information and second location information of the user spectacles 30 when L is changed to obtain the location change information, and decomposing the location change information into the horizontal and vertical directions to obtain horizontal direction location change information and vertical direction location change information.

As to the horizontal direction location change information, the image on the display screen 10 can be corrected according to the method when the user comes near to or goes away from the display screen 10. Thus, the size of the image should be amplified or reduced according to the information of the horizontal direction location change in order to maintain the size of the virtual image to be unchanged.

Similarly, when the user comes near to the display screen 10, each object in the image should be moved in a direction away from the center of the display screen 10 in order to maintain the location of the virtual image to be unchanged (assume that the user views just facing the plane, i.e. the projection point of the user on the plane of the display screen 10 is just the center of the display screen 10), wherein the distance moved in the image direction is also calculated by the formula $[(d×S)/(L'−S)]−[(d×S)/(L−S)]=[(L−L')×d×S]/[(L'−S)×(L−S)]$, wherein S is the distance between the virtual image and the screen (out-of-screen is positive, and in-screen is negative), d is the distance between the virtual image and the screen center, L is the original distance between the user and the display screen 10, and L' is the final distance between the user and the display screen 10.

As to the vertical direction location change information, it can be treated according to the situation when the user moves parallel to the plane of the display screen 10 in a small range just facing the display screen 10. Therefore, when the user moves in horizontal, each object in the image should move in the same direction in order to maintain the location of the virtual image to be unchanged. Specifically, the distance moved is also calculated by the formula $(c×S)/(S−L)$.

Finally, the final correction information of the virtual image is obtained by synthesizing the correction information of the image above.

Figure 6:
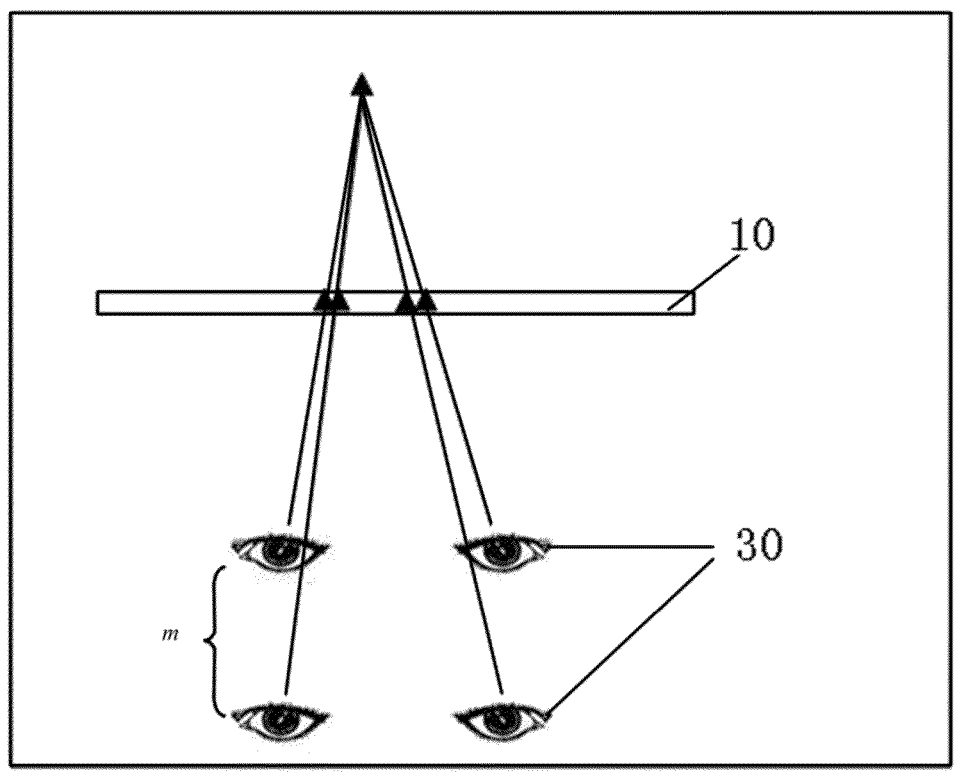
FIG. 6 is a schematic diagram of a preferred embodiment of a method for controlling stereoscopic display according to the present invention.

Considering the distance between the left and right eyes of a person is usually 65 mm, the relative displacement above is not more than 15 mm to assure prevention of the situation that it is hard to focalize after the displacement. Reference is made to FIG. 6 which is a schematic diagram of a preferred embodiment according to the present invention, when the user comes near to m, the left and right image displacement is amplified by $65×S\{[1/(L−m)]−1/L\}≈65×S×m/L^2$, i.e. the image displacement is proportional to the user distance. Therefore, a displacement correction of the left and right images can be carried out according to this formula. In fact, the left and right images are adjusted in a manner of phase difference. As the display areas of the display screen 10 have different sizes, e.g. 42 inches, 47 inches, 55 inches, respective pixel displacement corrections should be made for different display screens 10. Take 47 inches as an example. Its horizontal display length is about 1050 mm, if a displacement of 5 mm is needed according to calculation, $5*1920/1050≈9$ pixels should be moved according to a resolution of 1920*1080. Therefore, the processor should have the function of refreshing frame by frame the pixel movements of the whole screen.

To this end, one area may be provided in a parameter memory (such as E2PROM or FLASH) configured to store coefficient. It can facilitate debugging and compatibility by deciding the coefficient between the displacement pixel and the moved distance m through practical debugging.

According to the principle above, generally, the nearer the user comes to the display screen 10, the nearer the virtual image of the in-screen object comes to the user, and the farther the virtual image of the out-screen object is away from the user; while the bigger the phase difference (the closer the phase different approximates 65 mm), the farther the virtual image of the object is away from the user. Thus, the deviation of the in-screen object may be counteracted, while the deviation of the out-screen object is magnified. The method for correcting the 3D display above can be accomplished just using the principle that the former can be counteracted.

Figure 7:
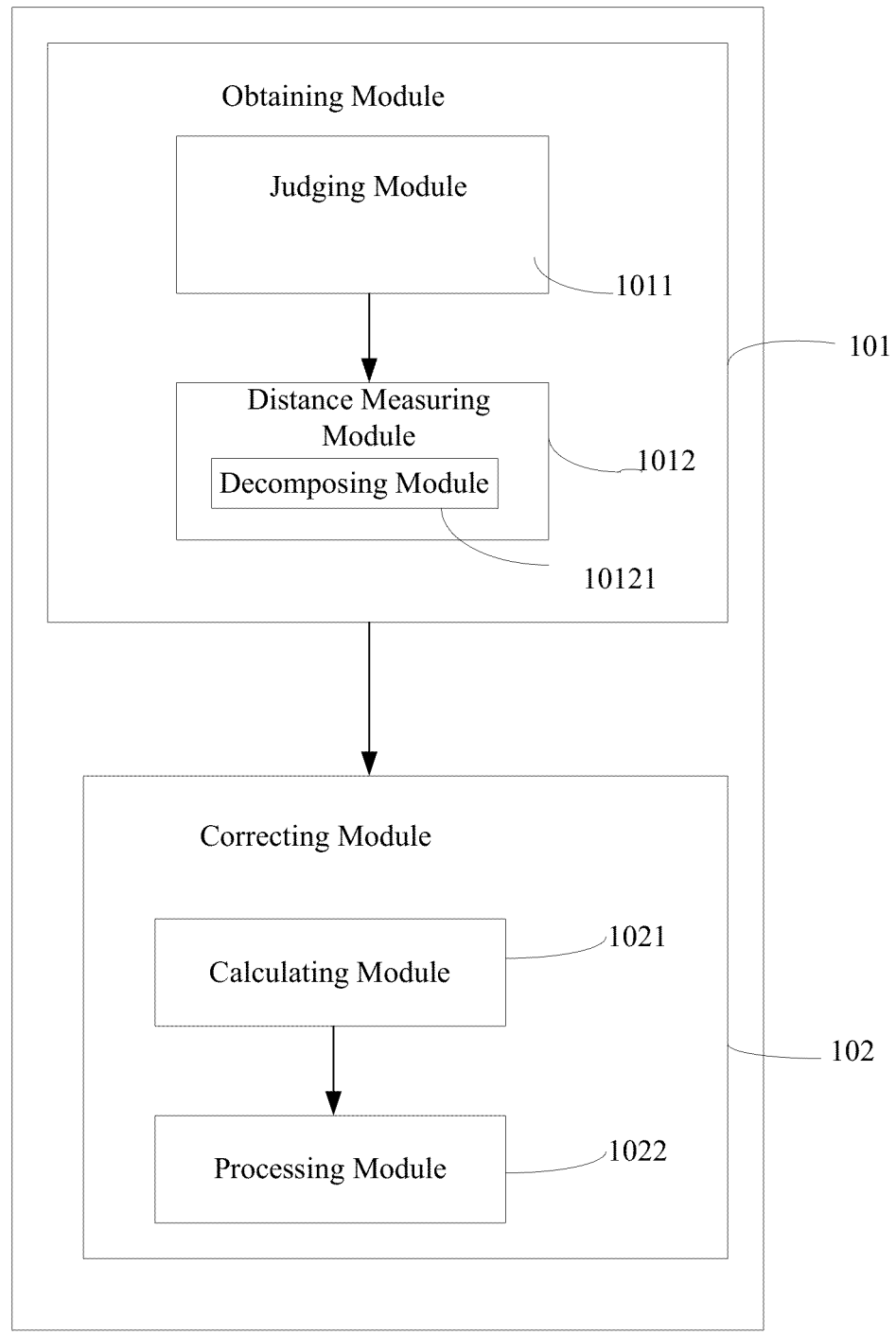
FIG. 7 is a structure schematic diagram of an apparatus for controlling stereoscopic display according to one embodiment of the present invention.

An apparatus for controlling stereoscopic display provided according to the method for controlling the stereoscopic display above, as shown in FIG. 7 which is a structure schematic diagram of an apparatus for controlling stereoscopic display according to one embodiment of the present invention, comprises an obtaining module 101 configured to obtain location change information of user spectacles 30; and a correcting module 102 configured to correct an image on the display screen 10 according to the location change information of the user spectacles 30.

Preferably, the obtaining module 101 above further may comprise a judging module 1011 configured to judge whether locations of the user spectacles 30 are changed; and a distance measuring module 1012 configured to obtain first location information of the user spectacles 30 and second location information of the user spectacles 30.

Preferably, the distance measuring module 1012 above further may comprise a decomposing module 10121 configured to decompose the location change information of the user spectacles 30 into horizontal direction location change information and vertical direction location change information.

Preferably, the correcting module 102 above further may comprise a calculating module 1021 configured to calculate correction times, horizontal correction information and vertical correction information of the virtual image according to the location change information of the user spectacles 30.

Preferably, the correcting module 102 above further may comprise a processing module 1022 configured to process the correction times, the horizontal correction information and the vertical correction information of the virtual image into a correction signal.

Preferably, the apparatus for controlling the stereoscopic display can provide a parameter memory (such as E2PROM or FLASH) in the processing module 1022, and one area is provided in the parameter memory to be used for storing a coefficient. It can facilitate debugging and compatibility by deciding the coefficient between the displacement pixel and the moved distance through practical debugging.

As the location of the virtual image is related to the viewing distance, a 3D display device (a display or TV) should provide an optimal viewing position (possibly theoretically calculated or practically measured) to be recommended to the user, for the sake of reducing the problem of irreal stereoscopic impression as the location of the stereo virtual image is moved when the user moves his head, so as to accomplish an optimal viewing effect.

In the present technical solution, the distances are measured through automatic induction to process the 3D stereo image contents so as to produce a changeless virtual image and improve the real stereo sense of 3D Particularly, according to different requirements and system complexities, an advanced processing solution giving attention to the location, size and in-screen and out-of-screen at one and the same time and a simple processing solution merely processing the in-screen stereo image location can be accomplished to be adapted to different application situations.

Therefore, compared with the prior art, in the technical solutions of the present invention, in order to still maintain a real stereo sense when the user's location is changed, the change of the virtual image location 20 is precisely calculated using the distance measuring technology, and the virtual image location 20 people see is made to be unchanged by calculating and correcting the image on the display screen 10, thus improving the sense of reality of the stereoscopic display.

The above mentioned is merely the preferred embodiments of the present invention but not to limit the present invention. Various alterations and changes to the present invention are apparent to the person skilled in the art. Any modifications, equivalent substitutions, improvements etc. within the spirit and principle of the present invention should be concluded in the scope protected by the present invention.

What is claimed is:

1. A method for controlling stereoscopic display, comprising
    obtaining location change information of user spectacles; and
    correcting an image on a display screen according to the location change information of the user spectacles.

2. The method for controlling stereoscopic display according to claim 1, wherein the obtaining the location change information of the user spectacles comprises:
    judging whether locations of the user spectacles are changed or not; and
    obtaining the location change information of the user spectacles when the locations of the user spectacles are determined to be changed.

3. The method for controlling stereoscopic display according to claim 1, wherein the obtaining the location change information of the user spectacles comprises:
    obtaining first location information of the user spectacles;
    obtaining second location information of the user spectacles; and
    obtaining the location change information of the user spectacles according to the first location information and the second location information, and wherein the location change information comprises horizontal direction location change information and vertical direction location change information.

4. The method for controlling stereoscopic display according to claim 3, wherein the correcting the image on the display screen according to the location change information of the user spectacles comprises:
    obtaining correction times, horizontal correction information and vertical correction information of a virtual image according to the location change information of the user spectacles; and
    correcting the image on the display screen according to the correction times, the horizontal correction information and the vertical correction information.

5. The method for controlling stereoscopic display according to claim 3, wherein the horizontal direction location change information comprises:
    horizontal direction location change information of the user spectacles with respect to a virtual image; and
    horizontal direction location change information of the user spectacles with respect to the display screen; and
    the vertical direction location change information comprises:

vertical direction location change information of the user spectacles with respect to the virtual image; and vertical direction location change information of the user spectacles with respect to the display screen.

6. An apparatus for controlling stereoscopic display, comprising:

a memory; and one or more processors, wherein the memory is configured to store computer readable program codes, and the one or more processors execute the computer readable program codes to implement:

an obtaining module configured to obtain location change information of user spectacles; and a correcting module configured to correct an image on a display screen according to the locating change information of the user spectacles.

7. The apparatus for controlling stereoscopic display according to claim 6, wherein the obtaining module comprises:

a judging module configured to judge whether locations of the user spectacles are changed or not; and a distance measuring module configured to obtain first location information of the user spectacles and second location information of the user spectacles.

8. The apparatus for controlling stereoscopic display according to claim 7, wherein the distance measuring module comprises:

a decomposing module configured to decompose the locating change information of the user spectacles into horizontal direction location change information and vertical direction location change information.

9. The apparatus for controlling stereoscopic display according to claim 6, wherein the correcting module comprises:

a calculating module configured to calculate correction times, horizontal correction information and vertical correction information of a virtual image according to the location change information of the user spectacles.

10. The apparatus for controlling stereoscopic display according to claim 9, wherein the correcting module further comprises:

a processing module configured to process the correction times, the horizontal correction information and the vertical correction information of the virtual image obtained through calculation into a correction signal, and the correcting module corrects the image on the display screen according to the correction signal.

11. The method for controlling stereoscopic display according to claim 2, wherein the obtaining the location change information of the user spectacles comprises:

obtaining first location information of the user spectacles;

obtaining second location information of the user spectacles; and obtaining the location change information of the user spectacles according to the first location information and the second location information, and wherein the location change information comprises horizontal direction location change information and vertical direction location change information.

* * * * *